US007186006B2

(12) United States Patent
Dean et al.

(10) Patent No.: US 7,186,006 B2
(45) Date of Patent: Mar. 6, 2007

(54) REDUCED-FOOTPRINT NIGHT ILLUMINATION LASER SYSTEM

(75) Inventors: David A. Dean, Commerce Twp., MI (US); Richard Drumsta, Walled Lake, MI (US); Wieslaw S. Zaydel, Milford, MI (US); Michelle A. Winowski-Zaydel, Milford, MI (US)

(73) Assignee: Pursuit Engineering LLC, Milford, MI (US)

( * ) Notice: Subject to any disclaimer, the term of this patent is extended or adjusted under 35 U.S.C. 154(b) by 181 days.

(21) Appl. No.: 10/978,829

(22) Filed: Oct. 29, 2004

(65) Prior Publication Data

US 2006/0077662 A1    Apr. 13, 2006

Related U.S. Application Data

(60) Provisional application No. 60/522,525, filed on Oct. 8, 2004.

(51) Int. Cl.
G02B 27/18    (2006.01)
(52) U.S. Cl. ........................ 362/259; 362/294
(58) Field of Classification Search .............. 362/109, 362/259, 268, 311, 294, 373; 359/15; 372/98, 372/99, 101
See application file for complete search history.

(56) References Cited

U.S. PATENT DOCUMENTS 5,563,868 A * 10/1996 Farnsworth et al. ...... 369/44.23
5,659,533 A *  8/1997 Chen et al. ............ 369/112.01
5,696,750 A * 12/1997 Katayama .............. 369/112.06

* cited by examiner

*Primary Examiner*—Y. My Quach-Lee
(74) *Attorney, Agent, or Firm*—Dort Patent Corp.; David Dort

(57) ABSTRACT

The present invention provides for a laser diode light diffusion unit that comprises a casing 10 with a lens cover that holds a laser diode mounted 2 on a heat sink 16, a mirror 12, a collimator lens 4 and a holographic diffusion screen 8. The casing 10 is made of a rigid thermally conducting material, and the heat sink is mounted within the casing such that a concentrated beam of light 3 produced by the laser diode 2 is directed at the mirror 12. The concentrated beam of light 3 directed at the mirror is reflected at approximately 90° into the base of the collimator lens 4, where the collimator lens 4 converts the concentrated beam 3 of light into a plane of light 6 that is projected over and in opposite direction to the path of the concentrated beam of light 3. The plane of light 3 then passes through the holographic diffusion screen 8, where the holographic diffusion screen spreads the plane of light at predetermined angles which then passes through the lens cover and out of the casing.

20 Claims, 5 Drawing Sheets

REDUCED-FOOTPRINT NIGHT ILLUMINATION LASER SYSTEM

CROSS-REFERENCE TO RELATED APPLICATIONS

This application claims priority to U.S. provisional application 60/522,525, filed Oct. 8, 2004, by David Dean, et al., which is hereby incorporated by reference.

BACKGROUND OF THE INVENTION

Laser diode illumination systems function by dispersing a single point laser light source into a diffuse light beam. This is accomplished by passing the laser light beam through various screens, such as collimators and diffusers until the tight beam of light is spread into a sufficiently broad beam. For most applications, it is desirable to spread the light beam evenly; however, for some applications an uneven spreading of the beam may be desired.

A significant problem with laser diode illumination systems is that the equipment needed to convert a strong laser light source into a diffuse light beam is considerable. Efforts have been made to reduce the size of the laser diode illumination systems, such as in U.S. Pat. No. 6,429,429 B1. However, the systems remain relatively large.

By reducing the size of the illumination sources, industries such as night vision systems can offer products that are more portable and efficient and therefore, more usable. Also, current portable night vision illumination devices produce relatively low illumination levels and poor energy efficiency, which, in turn, limits night vision equipment to narrow fields of view with low resolution.

What is needed is a laser diode illumination device that is smaller and more portable, also known as having a reduced footprint, without impeding illumination quality.

SUMMARY OF THE INVENTION

With the foregoing in mind, methods and apparatuses consistent with the present invention, inter alia, facilitates illumination of an area with a laser diode light source that has been diffused by a portable light diffusion unit. The light diffusion unit is generally encased in a thermally conductive material that is approximately 6 inches (15 cm) long, 3.0 inches (7.5 cm) wide and 3.5 inches (8.75 cm) high and approximately 2 pounds (0.9 kg). Within the unit, one or more laser diode light sources direct a concentrated light beam at a mirror that then reflects the light into the base of a collimator lens. The collimator lens turns the concentrated beam of light into a plane of light projected normal to the source beam. The radiation field in the form of a "plane" projects the plane of light passes over the path of the concentrated beam of light. This plane of light then passes through a light diffuser that spreads the light in a determined pattern and generally acts as a Fourier transform (or other desirable non-linear transform) for the radiation (light) plane.

The intensity of illumination is directly related to the power of the laser diode and the efficiency of the system. Laser diodes in the 10–20 watt range will typically be used, although wattages outside this range can also be used depending on the application. The efficiency of the system depends in large part on the quality of the parts used; however, an efficiency of 65% is readily obtainable and can reach higher efficiencies depending on the type may be reached and quality of various components, needed by the end-user, particularly the lenses. The frequency of the illuminating light can also be varied, but in certain embodiments, it is in the 800–950 nm range (infrared).

These and other objects, features, and advantages in accordance with the present invention provide particular embodiments with a portable laser diode light diffuser that comprises a casing. The casing is comprised of rigid, thermally conductive materials and one or more laser diode light source, where the one or more laser diode light source emits a concentrated beam of light at a predetermined wavelength. A mirror reflects the concentrated beam of light from the laser diode into a collimator lens. The collimator receives the concentrated beam of light and projects the concentrated beam of light into a "plane" of light and then into a diffusion screen, where the diffusion screen spreads the plane of light a predetermined amount. The portable laser diode light diffuser illuminates an area in front of the portable laser diode light diffuser, and the efficiency of the portable laser diode light diffuser is approximately 65% but can go higher. Also, in most embodiments, the path of the plane of light passes over and in an opposite direction to the concentrated beam of light.

In another embodiment, the present invention provides for a laser diode light diffusion unit that comprises a laser diode, a mirror and a collimator lens. The laser diode produces a concentrated beam of light that reflects in the mirror and into the base of the collimator lens, where the collimator lens then converts the concentrated beam of light into a plane of light that is projected over and in an opposite direction to the path of the concentrated beam of light.

In still another embodiment, the present invention provides for a laser diode light diffusion unit that comprises a casing with a lens cover that holds a laser diode mounted on a heat sink, a mirror, a collimator lens and a holographic diffusion screen. The casing is made of a rigid thermally conducting material, and the heat sink is mounted within the casing such that a concentrated beam of light produced by the laser diode is directed at the mirror. The concentrated beam of light directed at the mirror is reflected at approximately 90° into the base of the collimator lens, where the collimator lens converts the concentrated beam of light into a plane of light that is projected over and in an opposite direction to the path of the concentrated beam of light. The plane of light then passes through the holographic diffusion screen, where the holographic diffusion screen spreads the plane of light at predetermined angles which then passes through the lens cover and out of the casing.

BRIEF DESCRIPTION OF THE FIGURES

The invention is explained in more detail by way of example with reference to the following drawings.

DETAILED DESCRIPTION OF THE INVENTION

The present invention provides for a portable illumination device with a reduced footprint size. Particular embodiments of the invention are useful in illumination in conjunction with many night-vision technologies or other applicable areas, such as surveillance, search and rescue, robot vision, machine vision, etc. Laser diodes are an excellent source of illumination and can provide radiation for a variety of different spectrums, particularly infrared. Unfortunately, the laser diodes produce a very tight beam of light, which essentially over-illuminates a very small area, as well as creates damage to the human eye.

The present invention diffuses the laser diode light beam so that a much larger area can be thoroughly illuminated than would otherwise be possible with laser diode illumination sources. The spreading of the light beam is controlled by a variety of diffusers and lenses, and can be adjusted according to the needs of the user. However, the size of the laser light diffuser is reduced in comparison to that of the prior art. The reduction is partly accomplished by redirecting the light beam source back over itself as it is being diffused.

Figure 1:
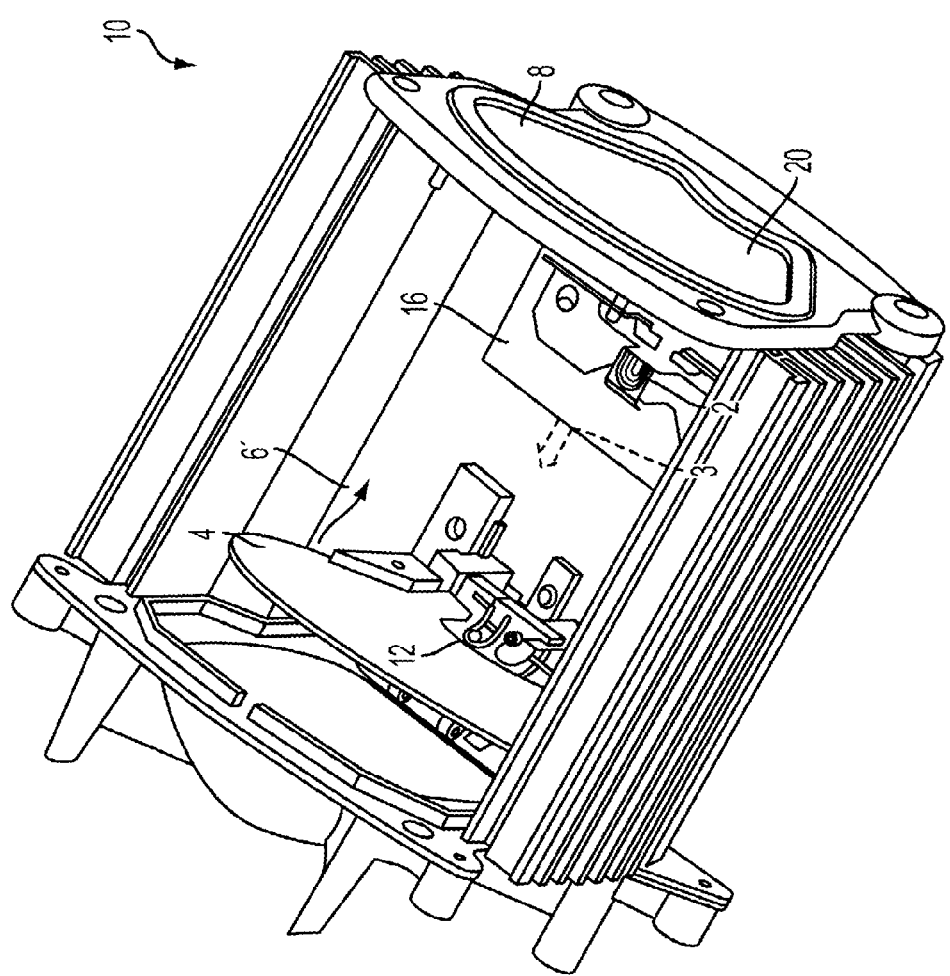
FIG. 1 illustrates one embodiment of a light diffuser unit according to one embodiment of the present invention.

Referring to FIG. 1, one embodiment of a portable laser diode light diffuser is shown. The light diffuser unit illustrated comprises a laser diode source 2 that projects light into a collimator lens 4. In this manner, a single beam of high intensity light is transformed into a plane of projected light 6. The plane of projected light 6 passes out of the light diffuser unit, usually though a diffuser screen 8 to illuminate an area.

The laser diode 2 may be of a variety of types, such as an Osram™ diode. In some embodiments, the light from the diode is non-collimating, but can also be divergent in particular embodiments. Typical diodes project light as a tight rectangle. A non-collimating diode projects light as an expanding rectangle. The dimensions of the rectangle will vary depending on application, as well as on the internal geometries of the light diffusion unit. In particular embodiments, the wavelength of the light produced by the diode does not change by being diffused by the light diffusion unit.

In the embodiment illustrated in FIG. 1, a single laser diode 2 is used. In other embodiments, a plurality of laser diodes can be used in close conjunction with one another. The plurality of laser diodes may be of the same frequency, to produce a stronger projected light, or they may be of a variety of frequencies so that a diffuse light with a greater frequency range is produced.

Figure 4:
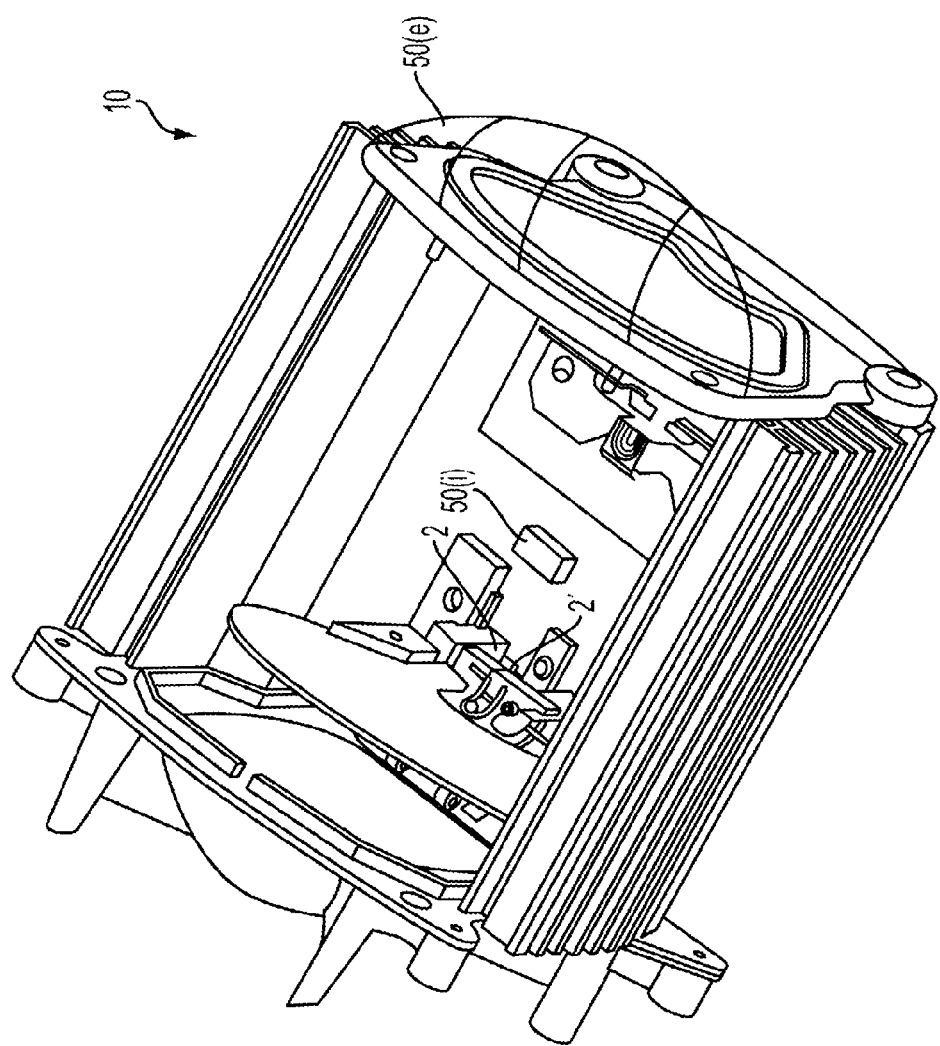
FIG. 4 illustrates details of an alternate embodiment, in which a second type of radiation "floods" the first or a second type of laser diode is used.

In addition to the above, particular embodiments allow specific color effects to be accomplished. These color effects may be accomplished by a second type of laser diode 2', or may be accomplished by flooding the unit with another type of light external 50(e) to the illustrated light path, as shown in an alternate embodiment in FIG. 4. For example, in the 808 nm range discussed below, the light diffusion unit will illuminate an area with invisible light, however, a small amount of red spectrum visible light will also be produced. Since red lights have particular meanings in many industries, it may not be desirable to have the light diffusion unit shine red. A second visible light source can be added almost anywhere within the light diffusion unit, such as 50(i). For instance, green floods out the red glow, creating an 808 nm invisible light source that also appears to shine green. Of course the second light source, unless emitted from a diode and forced through the illustrated pathway, will not illuminate in the same manner as the first.

Alternately, the plurality of laser diodes can be pulsed so that diodes of the same frequency can produce a continuous stream of plane projected light, or at least continuous enough to the human eye or equipment monitoring the light diffuser unit. In this embodiment, the pulsing of the diodes reduces their heat output and also increases the life expectancy of the diodes. It is also possible that a light diffuser unit can function at a variety of different states, such that if a stronger light source is required, multiple diodes turn on simultaneously, while a more heat/energy/life conservative mode can be used in default that pulses the diodes. Additionally, the rate of pulse between the diodes can be changed depending on what is using the light diffuser as a light source. For instance, a camera outfitted with the appropriate filters and lenses for recording the illuminated area, might require more or less pulses of light to function optimally (similar to certain machine vision technologies) than the human eye looking through goggles.

Efficiency, as used herein, refers to the total intensity of the light as emitted from the laser diode to the total intensity of the light emitted from light diffusion unit. For example, it is preferable if the collimator lens reduces the efficiency of the system by approximately 15% or less. As is known in the art, high-efficiency collimators can be made of expensive materials that are labor intensive to produce, but that can increase efficiency.

Various types of collimators 4 can be used with the present invention. The basic principle of the collimator is to receive a light source and convert it into a broader column or cone, referred to herein as a plane of light. One such collimator lens is described in U.S. provisional application 60/522,395, entitled HIGHLY-EFFICIENT OPTICAL COLLECTION SURFACES AND METHOD FOR MANUFACTURING SAME by David A. Dean et al, and filed Sep. 24, 2004, in the United States Patent and Trademark Office, which is incorporated herein by reference.

As the projected planar light 6 leaves the casing 10, it passes through a diffusion screen 8. The diffusion scatters the light over a broader area, and preferably spreads the light in an even manner, although in some applications, an uneven spreading of the light may be desirable. One type of filter, known as a holographic diffuser, generally acts in a non-linear manner (generally as a Fourier transform) and spreads the light in a uniform way or other intended pattern (depending on the Fourier patter) without changing its frequency and without a large impact on the net illumination. Holographic diffusers are generally in the form of a thin polycarbonate film or screen, supplied by POC.™. of Torrance, Calif. The specifications regarding these holographic diffusion systems are available directly from POC, and included are both "standard" (off the shelf) and "custom" solutions from the aforementioned company. In addition to spreading the light evenly or not, exactly how the light is spread can vary depending on the application and the needs of the end user. Essentially, a wider area of illumination can be spread in exchange for illumination distance and vice versa. A particular range of spread would be 10.degree. vertically, both up and down, and 20.degree. horizontally, to both sides, but will vary depending of the needs of the end user. For example, robot vision for search and rescue will require a different range than a camera recording night surveillance photos.

A holographic diffuser will reduce the overall efficiency of the light diffuser unit by 5–8%. Therefore optimizing the spread of the light with fewer light diffusers is preferable. However, as given in an embodiment below, sometimes additional light diffusers are added to improve the light spread so that the overall efficiency is optimized and/or the desirable non-linear transform of the light plane emanates from the system. Other components that reduce efficiency but improve the system as a whole may also be used. For example, putting a protective lens or cover 20, such as a glass or acrylic lens, over the end of the unit may reduce efficiency by about 2–5%, but will provide protection for the diffusion screen and internal components, and may be part of the end-user's needs, such as manufacturing costs (plastic mold injection, snap-on, etc.). A plastic-mold injection system that can incorporate the holographic diffuser system because of its polycarbonate properties with a tough acrylic lens that can snap into the rigid body is particularly efficient for cost reduction and reduced manufacturing error.

In this embodiment the casing 10 of the light diffuser is made with rigid, thermally conducting (and preferably) light weight materials, such as, but not limited to, aluminum. The purpose of the casing 10 is two fold. It provides protection to the instruments within and it diffuses heat (heat sink). Although the collimator lens 4 and mirrors 12 can be themselves made with a variety of materials, ranging from very fragile to relatively non-fragile, it is still preferred that they not be exposed to impact damage. The surfaces of the collimator lens 4 and mirrors 12 further need to be kept as clean and clear as possible, so that the casing 10 is air tight, and in some embodiments filled with gasses that do not scatter the projected light 6. To aid in the diffusion of heat, the casing 10, as illustrated in FIG. 1, has a plurality of fins that further aid in the diffusion of heat without adding significant weight.

The casing itself can be a closed system, in that it can be an air tight unit. This would prevent dust and other materials from collecting on the internal surfaces. However, a particular embodiment allows for the flow of air into the unit while filtering dust particles. Gortex™ seals are an example of a passive air filter that does not allow in particle contaminants or water.

The heat produced from the laser diode can further be dissipated in a number of different ways. One such way is to place the diode on a heat sink 16, such as a copper block, which may include up to 100 percent copper (which is preferably not machined directly). Although heat sinks will increase the weight of the light diffuser unit, there is a trade off between weight and heat diffusion. This trade-off is also dependent on the use of the light diffuser unit. Hand-held models will optimally include a heat sink, while those mounted on machinery could do without. The addition of a heat sink also limits the infrared light pollution that might otherwise contaminate the projected light 6 in some applications.

The heat sink itself might have an interface between itself and/or the diode and the casing. For example, indium foil can be placed between the diode and a copper block to improve dissipation. Also, other materials such as Wakefield Thermal Compound heat conductive grease can be used between the heat sink and the casing. Fans, both internal and external can also be used. An internal fan would optimally blow on or near the laser diode, while an external fan would supply air to the internal space. In addition, thermal electric coolers or TE coolers can be used to move heat from the heat sink to the external housing for greater heat transfer.

In the embodiment shown in FIG. 1, a mirror 12 reflects the laser diode light to the collimator lens 4. To make a light diffusion unit effective, the light emitted from the laser diode 2 needs to travel a certain distance before contacting the collimator lens 4. By reflecting the light in a mirror, the light is able to travel the required distance, but the space required in the light diffusion unit is essentially halved. This allows for the size of the light diffusing unit to be greatly reduced. In FIG. 1, the light from the diode travels approximately 2–3 inches (5–7.5 cm) to the mirror and then a short distance to the collimator lens. The use of a mirror in this manner will reduce the overall efficiency by approximately 1% to 5% or even less depending on the quality of the mirror.

The angles of the mirror in relation to the diode can be adjusted depending on what angle the diode is in relation to the collimator lens originally. In the embodiments illustrated, the light from the diode is changed by a 90° angle before contacting the collimator lens. Without the mirror, the laser diode needs to hit the collimator lens directly from below, however, the diode cannot be positioned too close to the lens. This is because the light from the diode needs to travel a certain distance so that proper spread is achieved. Also, the heat from the diode may damage some types of lenses.

In the embodiments shown, the light beam produced by a laser diode is passed back over itself as it is being diffused. The figures therefore have a sense of "up" for clarity. It would be apparent to one of ordinary skill in the art, however, that the configurations shown can be rotated at almost any angle to produce the same result. In fact, in some embodiments, it may be desirable to have the layout rotated 90° or 180° so that heat produced by the diode interferes less with the with the projected planar light. Therefore, in referring to the planar light passing "over" the concentrated light beam, this can be equally interpreted as "under," "beside," etc.

Figure 2A:
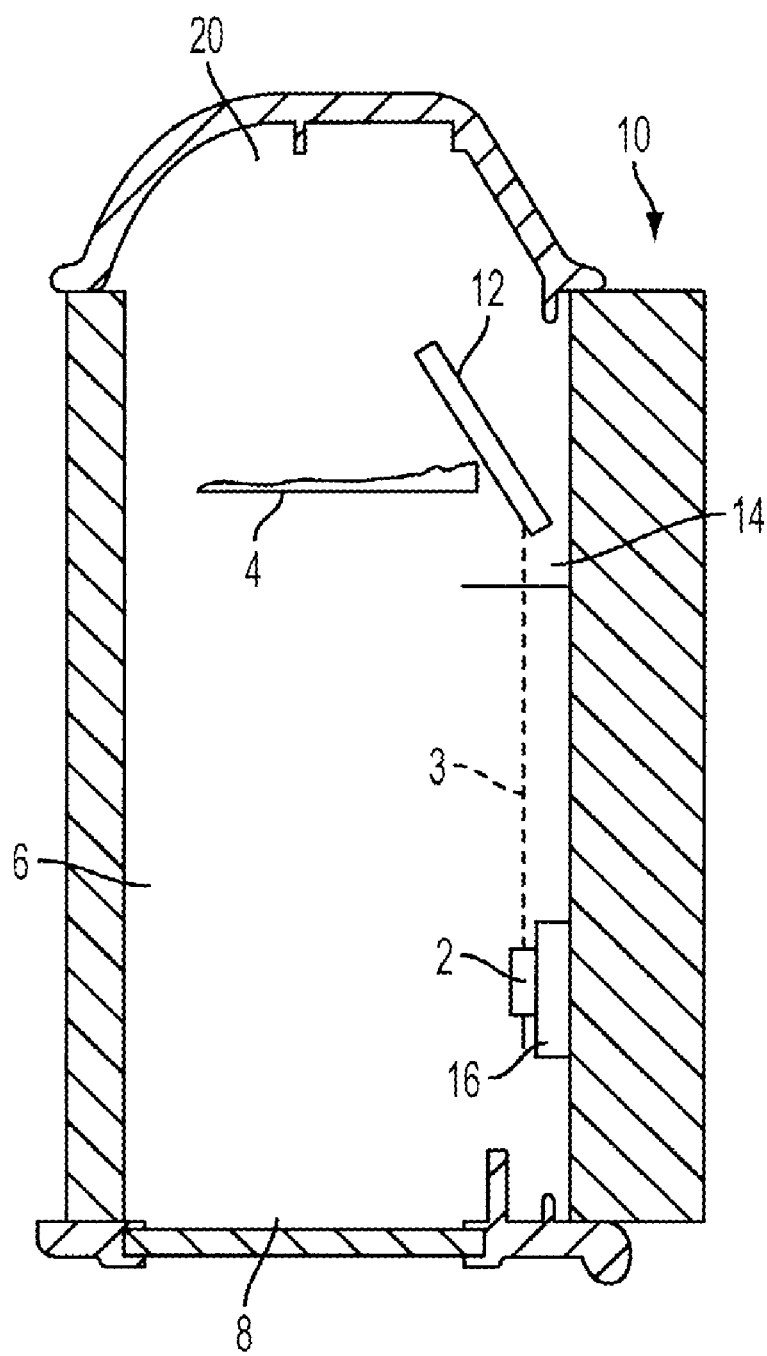
FIGS. 2A and 2B illustrate a side and top cutaway view of a light diffuser unit according to one embodiment of the present invention.
Figure 2B:
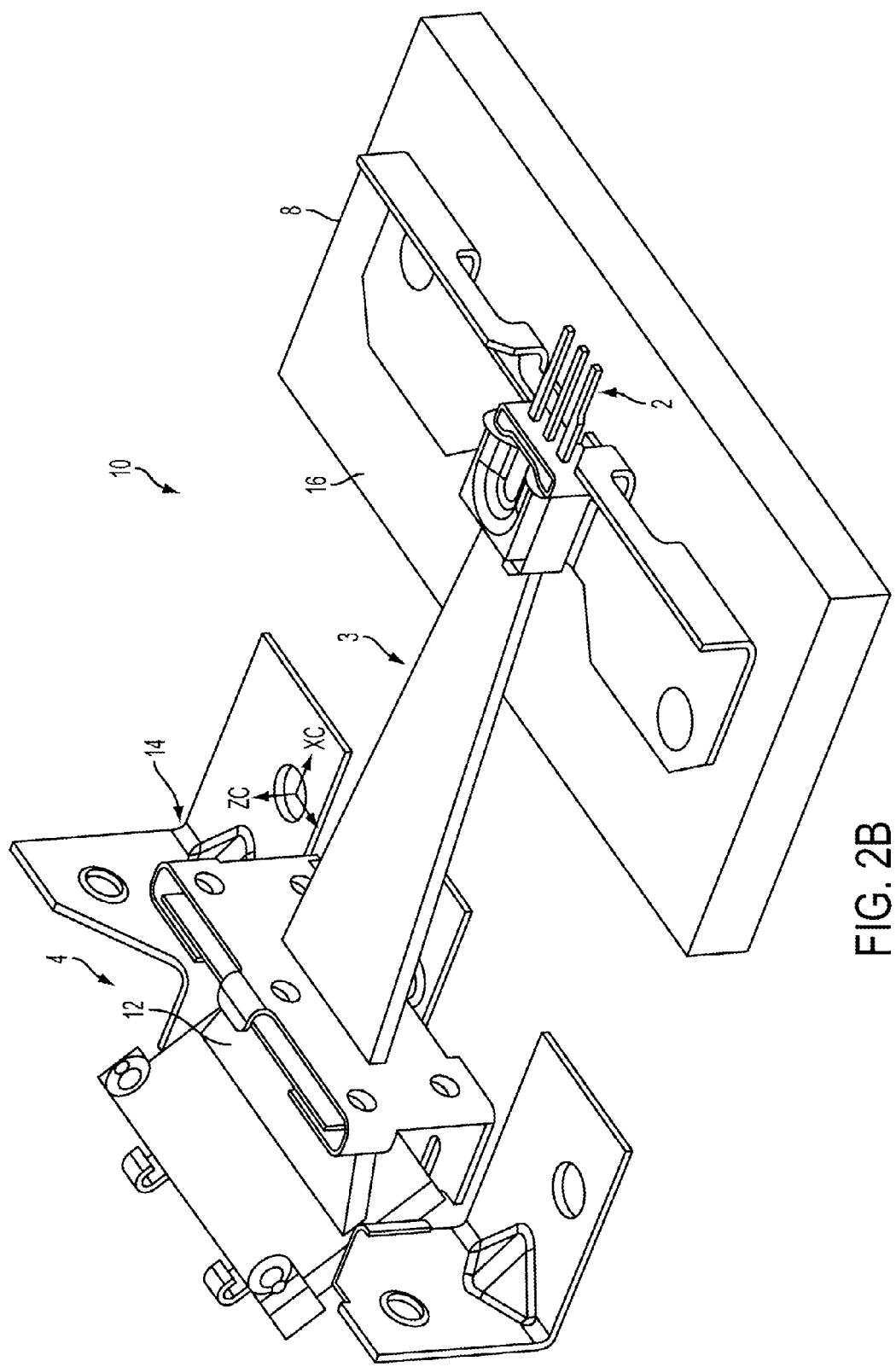

Referring to FIGS. 2A and 2B, the light path is illustrated from a side view as well as from above. One or more laser diodes 2 provide a concentrated beam of light 3 that reflects 90° in a mirror 12 to the base of a collimator lens 4. The concentrated beam of light 3 is naturally a tight beam as it emerges from the diode; however, some diodes produce a slightly rectangular beam, which aids in the diffusion.

To further aid in diffusion, in particular embodiments, the light may first pass through a first holographic diffusing film 14 which properly spreads the emitting light, generally through a non-linear (usually Fourier) transform. Although passing the light through additional mediums or multiple diffusers reduces overall light efficiency, at this stage it is more desirable to fill the base of the collimator lens. If the concentrated beam of light is produced from a non-collimating laser diode, then this step may not be necessary.

The concentrated beam of light 3 reflects in the mirror 90° to then strike the base of the collimator lens. The position of the laser diode 2 to the mirror 12 can vary depending on the type of diode used, but is approximately 2–3 inches (5–7.5 cm). Also, in FIGS. 2A and 2B, the laser diode is positioned straight at the mirror. However, if multiple laser diodes are being used, the diodes would need to be staggered so that the light strikes the mirror at an angle. The change in the light angle after striking the mirror would still be 90° with respect to the vertical, but there would also be a slight shift in regards to the horizontal as well so that the concentrated beam of light strikes the collimator lens at about the center of its base.

Once the concentrated beam of light 3 strikes the base of the collimator lens 4, the light is diffused into a plane of light 6 at a 90° from which it was received. The plane of light 6, also referred to as projected planar light, is described as such since photons traveling in it are traveling in the same direction and are fairly evenly distributed.

The plane of light 6 is then spread by a diffusion screen 8. The diffusion screen in most embodiments spreads the light in a uniform manner, though horizontal spreading may be favored over vertical spreading for certain applications and vice versa, as described above.

In the embodiments illustrated, there is shown a concave section 20 towards the back of the casing 10. This is a preferred location for objects such as a fan or monitoring equipment.

The dimensions of a portable light diffusion unit can vary, but in one embodiment the external casing is approximately 6 inches (15 cm) long, 3.0 inches (7.5 cm) wide and 3.5 inches (8.75 cm) high. Similarly, the weight of the unit can vary, but in the embodiments illustrated is approximately 2 pounds (0.9 kg), with approximately 6 ounces (0.17 kg) of that weight being the heat sink.

In the applications thus described, the invention has been applicable to any type of light. However, particular embodiments of the invention are used in conjunction with night vision technologies. Light in the range of approximately 800 to 950 nm is particularly useful for this application, though other ranges can also be used. For instance, 808 nm wavelength light is essentially invisible, although a dull red glow may still be seen. 915 nm wavelength light is even more invisible to the human eye. However, night vision equipment, such as a Watch™ CCD black and white camera, reads light at the 808 nm better than the 915 nm range. So, at the 808 nm range less power is required, since a less intense beam at the 808 nm can be observed with the night vision equipment better than an equivalently powered beam at 915 nm. Therefore, the wavelength can be varied depending on the corresponding night vision equipment. Some light diffusion units may even have multiple wavelength applications. Other wavelengths may be desirable in trying to make the light invisible to different types of animals for nighttime zoological studies.

The intensity of invisible light is measured in watts, which is directly a result of the power intensity of the laser diode being used. For example, an 808 nm laser diode that is powered at 10 to 20 watts will produce, at 65% efficiency, a 6.5 to 13 watts diffuse light. Diodes of 7–20 watts and even greater, will typically be used with the present invention, although different intensity diodes can also be used. As the technological development of laser diodes increases, it is expected that upper watt ranges of the present invention will also increase or may also be reduced in (downward) scalable embodiments of the invention.

Figure 3:
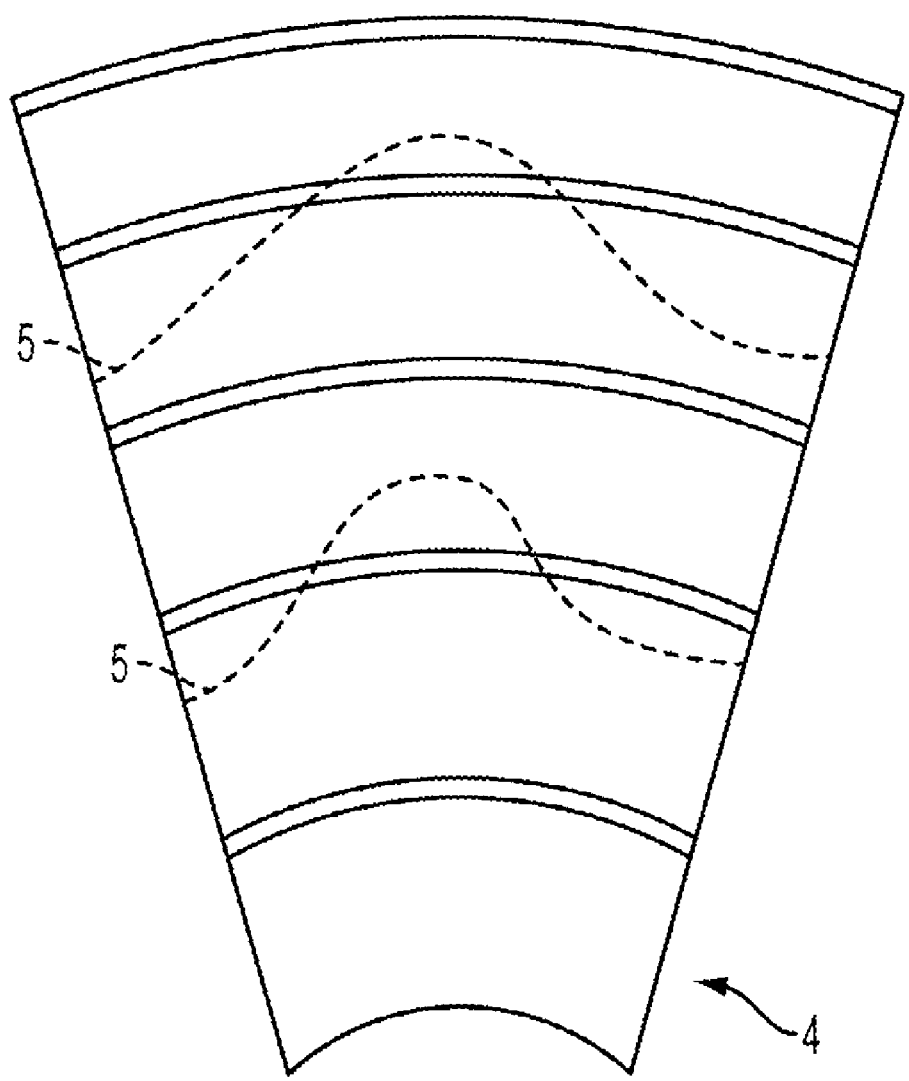
FIG. 3 illustrates an intensity spread of planar light emitting from a collimated lens as would occur in one embodiment of the present invention.

Referring to FIG. 3, a typical distribution of the intensity of planar light emitted from a collimator lens 4 is shown. This is a front on view of an embodiment of a collimator lens 4 showing that although the planar light is described above as substantially evenly distributed, areas of intensity are often still present. The planar light will be more intense towards the base of the collimator lens, with a gradual decrease in intensity moving up the lens. Although the intensity change is not abrupt, it does tend to resemble a Gaussian curve 5, or a double Gaussian curve if two light sources are being used.

Although the present invention is described as illuminating an area in front of the light source, whether with visible or invisible light, like any strong light source area, the sides and even behind the light source become illuminated as the light reflects off of the surfaces.

In one embodiment, the present invention provides for a portable laser diode light diffuser that comprises a casing, where the casing is comprised of rigid, thermally conductive materials and one or more laser diode light source. One or more of the laser diode light sources emits a concentrated beam of light at a predetermined wavelength. A mirror reflects the concentrated beam of light from the laser diode into a collimator lens. The collimator receives the concentrated beam of light and projects the concentrated beam of light into a plane of light and then into a diffusion screen, where the diffusion screen spreads the plane of light a predetermined amount. The portable laser diode light diffuser illuminates an area in front of the portable laser diode light diffuser. The efficiency of the portable laser diode light diffuser is approximately 65%. Also, the path of the plane of light passes over and in an opposite direction to the concentrated beam of light.

In a related embodiment, the mirror is positioned approximately 3 inches (7.5 cm) from the laser diode light source. The casing is composed of aluminum and may have fins to aid in thermal conductivity and also a controlled air intake. The diffusion screen is a holographic diffusion screen. The diffusion screen spreads the plane of light, such as 10° up and down and 20° side to side. However, it can be appreciated that positions and spreads may be adjustable and dimensions scalable, depending on the end uses and the energy requirements of the device.

In still another embodiment, the casing is approximately 6 inches (15 cm) long, 3.0 inches (7.5 cm) wide and 3.5 inches (8.75 cm) high and weighs approximately 2 pounds (0.9 kg) using a laser diode of 7–20 watt strength.

In another related embodiment, the predetermined wavelength is invisible to the human eye, such as 800–950 nm. In another embodiment, an additional light source is present within the casing to flood visible light produced by the laser diode.

In one embodiment, the diode is mounted to a heat sink, such as copper, which may include up to 100 percent copper that also may be non-machined.

In some embodiments, multiple laser diodes are used. These laser diodes may pulse at different times, providing a continuous stream of light to the collimator lens, or they may be activated together to provide an enhanced beam of light to the collimator lens. The laser diodes may all be of the same wavelength or they may have different wavelengths.

In another embodiment, the present invention provides for a laser diode light diffusion unit that comprises a laser diode, a mirror and a collimator lens. The laser diode produces a concentrated beam of light that reflects in the mirror into the base of the collimator lens, where the collimator lens converts the concentrated beam of light into a plane of light that is projected over and in an opposite direction to the path of the concentrated beam of light.

In still another embodiment the present invention provides for a laser diode light diffusion unit that comprises a casing with a lens cover that holds a laser diode mounted on a heat sink, a mirror, a collimator lens and a holographic diffusion screen. The casing is made of a rigid thermally conducting material, and the heat sink is mounted within the casing such that a concentrated beam of light produced by the laser diode is directed at the mirror. The concentrated beam of light directed at the mirror is reflected at approximately 90° into the base of the collimator lens, where the collimator lens converts the concentrated beam of light into a plane of light that is projected over and in an opposite direction to the path of the concentrated beam of light. The plane of light then passes through the holographic diffusion screen, where the holographic diffusion screen spreads the plane of light at predetermined angles and then passes through the lens cover and out of the casing.

The embodiment may also use a first holographic diffusion screen present between the laser diode and the mirror that spreads the concentrated beam of light such that the concentrated beam of light fills the base of the collimator lens. Alternately, the laser diode is a non-collimating laser diode.

Although the present invention is referred to as being portable, this is descriptive of its size and weight in contrast with the laser diode illumination devices of the prior art. The present invention may be permanently affixed or integral with a variety of systems or objects without departing from the scope of the present invention.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which, is to be given the full breadth of the claims appended and any and all equivalents thereof.

The invention claimed is:

1. A portable laser diode light diffuser comprising: a casing, wherein said casing is comprised of rigid, thermally conductive materials; at least one laser diode light source, wherein said at least one laser diode light source emits a concentrated beam of light at a predetermined wavelength; a mirror; a collimator lens; wherein said diode light source, said mirror and said collimator lens are configured such that said mirror reflects said concentrated beam of light from said at least one laser diode to said collimator lens; wherein a path of said plane of light passes over and in an opposite direction to said concentrated beam of light, wherein said collimator lens receives said concentrated beam of light and projects said concentrated beam of light into a plane of light; and a diffusion screen, wherein said diffusion screen spreads said plane of light a predetermined amount.

2. The portable laser diode light diffuser of claim 1, wherein said mirror is positioned approximately 3 inches (7.5 cm) from said laser diode light source.

3. The portable laser diode light diffuser of claim 2, wherein said predetermined wavelength is from 700–950 nm.

4. The portable laser diode light diffuser of claim 3, wherein said predetermined wavelength is 808 nm.

5. The portable laser diode light diffuser of claim 1, wherein said casing is substantially composed of aluminum or an aluminum alloy.

6. The portable laser diode light diffuser of claim 1, wherein said casing has a series of fins to aid in thermal conductivity.

7. The portable laser diode light diffuser of claim 1, wherein said an additional light source is present within said casing to flood visible light produced by said laser diode.

8. The portable laser diode light diffuser of claim 1, wherein said diffusion screen is a holographic diffusion screen.

9. The portable laser diode light diffuser of claim 1, wherein said diffusion screen spreads said plane of light 10.degree. up and down and 20.degree. side to side.

10. The portable laser diode light diffuser of claim 1, wherein said casing has a controlled air intake.

11. The portable laser diode light diffuser of claim 1, wherein said laser diode light source is mounted on a heat sink.

12. The portable laser diode light diffuser of claim 11, wherein said heat sink is copper.

13. The portable laser diode light diffuser of claim 1, wherein a plurality of laser diodes are used.

14. The portable laser diode light diffuser of claim 13, wherein said plurality of laser diodes pulse at different times, providing a continuous stream of light to said collimator lens.

15. The portable laser diode light diffuser of claim 13, wherein said plurality of laser diodes are capable of being activated together to provide an enhanced beam of light to said collimator lens.

16. The portable laser diode light diffuser of claim 13, wherein at least two of said plurality of laser diodes have different wavelengths.

17. The portable laser diode light diffuser of claim 1, wherein said casing is approximately 6 inches (15 cm) long, 3.0 inches (7.5 cm) wide and 3.5 inches (8.75 cm) high and weighs approximately 2 pounds (0.9 kg) using a laser diode of 7–20 watt strength.

18. A laser diode light diffusion unit comprising: a laser diode; a mirror; and a collimator lens; wherein said laser diode produces a concentrated beam of light that reflects in said mirror into a base of said collimator lens; wherein said collimator lens converts said concentrated beam of light into a plane of light that is projected over and in an opposite direction to a path of said concentrated beam of light.

19. The laser diode light diffusion unit of claim 18, wherein the frequency of said concentrated beam of light is 800–950 nm.

20. A laser diode light diffusion unit comprising: a casing that holds—a laser diode mounted on a heat sink; a mirror; a collimator lens; a holographic diffusion screen; and a lens cover; wherein said casing is made of a rigid thermally conducting material, and said heat sink is mounted within said casing such that a concentrated beam of light produced by said laser diode is directed at said mirror;

wherein said concentrated beam of light directed at said mirror is reflected at approximately 90.degree. into a base of said collimator lens and wherein said collimator lens converts said concentrated beam of light into a plane of light that is projected over and in opposite direction to a path of said concentrated beam of light;

wherein said plane of light passes through said holographic diffusion screen, wherein said holographic diffusion screen spreads said plane of light at predetermined angles then passes through said lens cover and out of said casing.

* * * * *